United States Patent [19]
Fukushima

[11] Patent Number: 5,345,532
[45] Date of Patent: Sep. 6, 1994

[54] ROTATION DRIVE DEVICE

[75] Inventor: Nobuo Fukushima, Yokohama, Japan

[73] Assignee: Canon Kabushiki Kaisha, Tokyo, Japan

[21] Appl. No.: 121,223

[22] Filed: Sep. 14, 1993

Related U.S. Application Data

[63] Continuation of Ser. No. 9,416, Jan. 27, 1993, which is a continuation of Ser. No. 846,968, Mar. 6, 1992, which is a continuation of Ser. No. 532,100, Jun. 1, 1990, which is a continuation of Ser. No. 51,041, May 15, 1987, Pat. No. 4,933,985.

[30] Foreign Application Priority Data

| May 21, 1986 | [JP] | Japan | 61-114922 |
| May 21, 1986 | [JP] | Japan | 61-114923 |
| May 21, 1986 | [JP] | Japan | 61-114924 |
| May 21, 1986 | [JP] | Japan | 61-114925 |
| May 21, 1986 | [JP] | Japan | 61-114926 |
| May 21, 1986 | [JP] | Japan | 61-114927 |

[51] Int. Cl.$^5$ .......................... H02P 5/00
[52] U.S. Cl. ............... 388/813; 388/812; 388/912; 388/907.5; 318/608; 358/342; 360/78; 360/73.03; 369/47
[58] Field of Search .............. 388/800–802, 388/809–814, 912, 907.5, 911; 318/68–70, 632, 599–610, 618, 621, 628; 360/70–71, 73, 73.03, 74.1, 74.2, 74.4, 75, 77, 81, 86; 369/47; 358/335, 342

[56] References Cited

U.S. PATENT DOCUMENTS

| 4,254,367 | 3/1981 | Sakamoto | 318/608 |
| 4,259,698 | 3/1981 | Takada . | |
| 4,283,671 | 8/1981 | Nakano et al. | 318/608 |
| 4,287,458 | 9/1981 | Nakamura et al. | 388/811 |
| 4,301,395 | 11/1981 | Furuhata . | |
| 4,418,307 | 11/1983 | Hoffman et al. . | |
| 4,564,795 | 1/1986 | Parkes et al. . | |
| 4,623,939 | 11/1986 | Machida et al. | 358/342 |
| 4,658,191 | 4/1987 | Okita et al. | 318/608 |
| 4,710,825 | 12/1987 | Okita et al. | 358/342 |
| 4,855,654 | 8/1989 | Fukushima | 369/47 |
| 4,933,985 | 6/1990 | Fukushima | 388/813 |

Primary Examiner—William M. Shoop, Jr.
Assistant Examiner—David Martin
Attorney, Agent, or Firm—Robin, Blecker, Daley & Driscoll

[57] ABSTRACT

A rotation drive device for driving a rotator is disclosed, comprising an electric motor for driving the rotator, a phase detecting circuit for detecting the phase of rotation of the rotator, a reference signal source for forming a reference signal of a constant period, a phase control circuit for controlling the motor in such a manner that the phase difference between the output of the reference signal source and the output of the phase detecting circuit becomes a constant value, a detecting circuit for detecting a fact that the reading-out of the phase difference is not completed in the time interval between the successive two outputs of the phase detecting circuit, a control circuit for varying the number of cycles of phase difference computing operation of the phase control circuit depending on the time interval between the successive two outputs of the phase detecting circuit, another detecting circuit for detecting a fact that the phase detecting circuit has produced no output in one period of the reference signal, and another detecting circuit for detecting a fact that the production of an output of the phase detecting circuit has repeated a plurality of times in one period of the reference signal.

15 Claims, 5 Drawing Sheets

ROTATION DRIVE DEVICE

This is a continuation application under 37 CFR 1.62 of prior application Ser. No. 08/009,416, filed Jan. 27, 1993, now abandoned, which is a continuation of Ser. No. 846,968, filed Jul. 6, 1992, which is a continuation application under 37 CFR 1.62 of prior application Ser. No. 532,100, filed Jun. 1, 1990 which is a continuation of Ser. No. 051,041, filed on May 15, 1987, now U.S. Pat. No. 4,933,985.

BACKGROUND OF THE INVENTION

1. Field of the Invention

This invention relates to rotator drive devices, and more particularly to a phase control device for a rotator.

2. Description of the Prior Art

In the conventional rotator drive device, for example, the disk drive device in the electronic still camera, it has been the common practice that the driving of the disk in such a manner to control phase of rotation of the electric motor is brought into coincidence with the clock signal which is used for regulating the timing in operating the camera whole. The use of such a method in controlling the speed (phase) of the motor, therefore, took a very long time. Thus, in the various operations of the camera, its ramp characteristic was less than desirable.

Also, a method of phase control may be considered in which the phase of an FG (Frequency Generator) pulse is synchronized in a delay of $\pi$ from the clock signal. In this case, however, the possibility of controlling the phase is unavoidably limited so that the phase lag of the FG pulses with respect to the clock signal must fall in a range from 0 to not more than $2\pi$.

Yet, with a sudden change of the load on the motor, the phase difference may likely exceed the above-defined maximum acceptable range.

For example, suppose, for every one revolution of the rotator (not shown), 16 FG pulses are obtained. If in this case, as the phase difference between the clock signal and the FG pulse was in the close neighborhood of $(15/8)\pi$ at the time of the $(n-1)$th cycle of sampling for control, the phase of the FG pulse delays more than $(1/8)\pi$ from the clock signal until the next or nth cycle of sampling. As a result, a phase lag of the FG pulse to the clock signal above $2\pi$ occurs. In the above-described control method, this situation is mistaken for a diminishment of the phase gap, because phase lags of $2\pi$ and zero cannot be discriminated from each other. Therefore, proper control could no longer be attained.

Hence, there has been demand for a rotator drive device having phase control capable of following larger variations and sudden changes in the load.

SUMMARY OF THE INVENTION

With the above-described problems in mind, the present invention has been made, and its object is to provide a rotator drive device which enables an accurate phase control of a rotator to be carried out even when the load varies either to a large extent, or at a high rate.

And, to achieve this object, in an embodiment of the invention, the rotator drive device is constructed with inclusion of rotation drive means for driving a rotator, first detecting means for detecting the phase of rotation of the rotator, a clock signal source for producing a periodical clock signal, phase control means for controlling the rotation drive means in such a manner that the phase difference between the output of the clock signal source and the output of the first detecting means takes a constant value by comparing the phase difference with a prescribed value, and second detecting means operating in such a manner that, as it reads out the phase difference after the first detecting means has produced an output, if the production of another output of the first detecting means occurs before this reading-out operation is performed, this is detected, whereby even when the aforesaid phase control means fails to compute with proper timing the phase control, a correcting cap measure can be taken by the detection which is obtained from the second detecting means, thereby giving an advantage that the range of phase control is so largely widened that the phase control becomes quickly, reliably and stably responsive even to a rapid, large variation of the load.

Another object of the invention is to provide for the rotator drive device with further inclusion of control means for varying the number of cycles of computing operation of the phase control means depending on the time interval from the moment at which the first detecting means has produced an output to the moment at which the first detecting means produces an output again, so that when the computing is too late, a shift to the next timing occurs, or the present cycle of computing operation is skipped to wait for the next data. Thus, even when a condition not suited to phase control occurs, an appropriate corrective measure can be taken. This makes it possible to widen the range of phase control, and to realize a rotator drive device which can quickly, stably, reliably and accurately cope even with a large variation of the load.

Still another object of the invention is to provide for the rotation drive device with further inclusion of means for detecting that the first detecting means has not produced an output in one period of the clock signal, whereby even when a condition not suited to phase control by the phase control means occurs, a proper measure can be taken with the help of the output of the detecting means described just above. Thus, a rotation drive device having a wider range of phase control and capable, upon variation of the load even to a large extent, of driving the rotator, quickly, reliably and accurately, stably, is realized.

A further object of the invention is to provide for the rotation drive device with further inclusion of control means arranged to cooperate with the detecting means for detecting a fact that the first detecting means has not produced any output in one period of the clock signal in such a manner that if that fact is detected, a speed control is made on the basis of the speed deviation, and after the speed of the aforesaid rotator has been stabilized by that control, a switching to the phase control takes place, whereby even when a condition not suited to phase control occurs, it is possible to cope with it by additionally using the speed control. Thus, a rotation drive device having a wider range of phase control and capable, upon variation of the load to a very large extent, of driving the rotator quickly, reliably and accurately, and stably, is realized.

A furthermore object of the invention is to provide for the rotation drive device with further inclusion of detecting means for detecting a fact that the first detecting means has produced a plurality of outputs in time spaced relation in one period of the clock signal, whereby even when a condition not suited to phase control by the phase control means occurs, it is possible to properly cope with it by utilizing the output of the just above-described detecting means. Thus, a rotation drive device having a wider range of phase control and capable, upon variation of the load to a very large extent, of driving a rotator quickly, reliably and accurately, and stably, is realized.

Yet another object of the invention is to provide for the rotation drive device with further inclusion of control means arranged to cooperate with the means for detecting a fact that the first detecting means has produced a plurality of outputs in time spaced relation in one period of the clock signal in such a manner that if that fact is detected, a speed control is made on the basis of the speed deviation, and, after the speed of the rotator has been stabilized by the speed control, a switching to the phase control means takes place. Thus, a rotation drive device having a wider range of phase control and capable, upon variation of the load to a very large extent, of driving the rotator quickly, reliably and accurately, and stably, is realized.

Other objects and features of the invention will become apparent from the following description taken in conjunction with the drawings.

DETAILED DESCRIPTION OF THE PREFERRED EMBODIMENT

The present invention next is described in detail by reference to the drawings.

Figure 1:
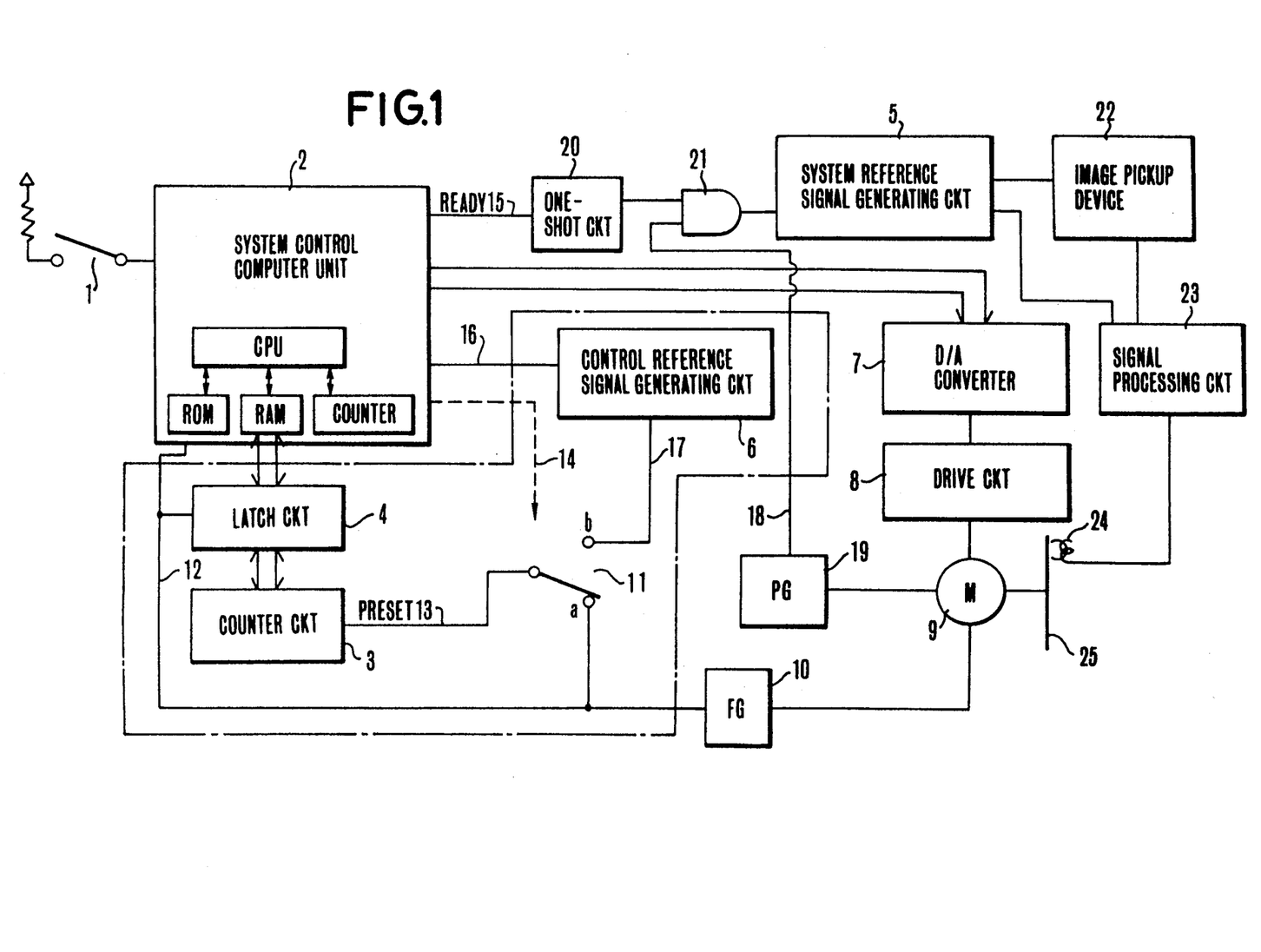
FIG. 1 is a block diagram illustrating an example of the construction of an embodiment of a rotator drive device according to the present invention applied to an electronic still camera.
Figure 2:
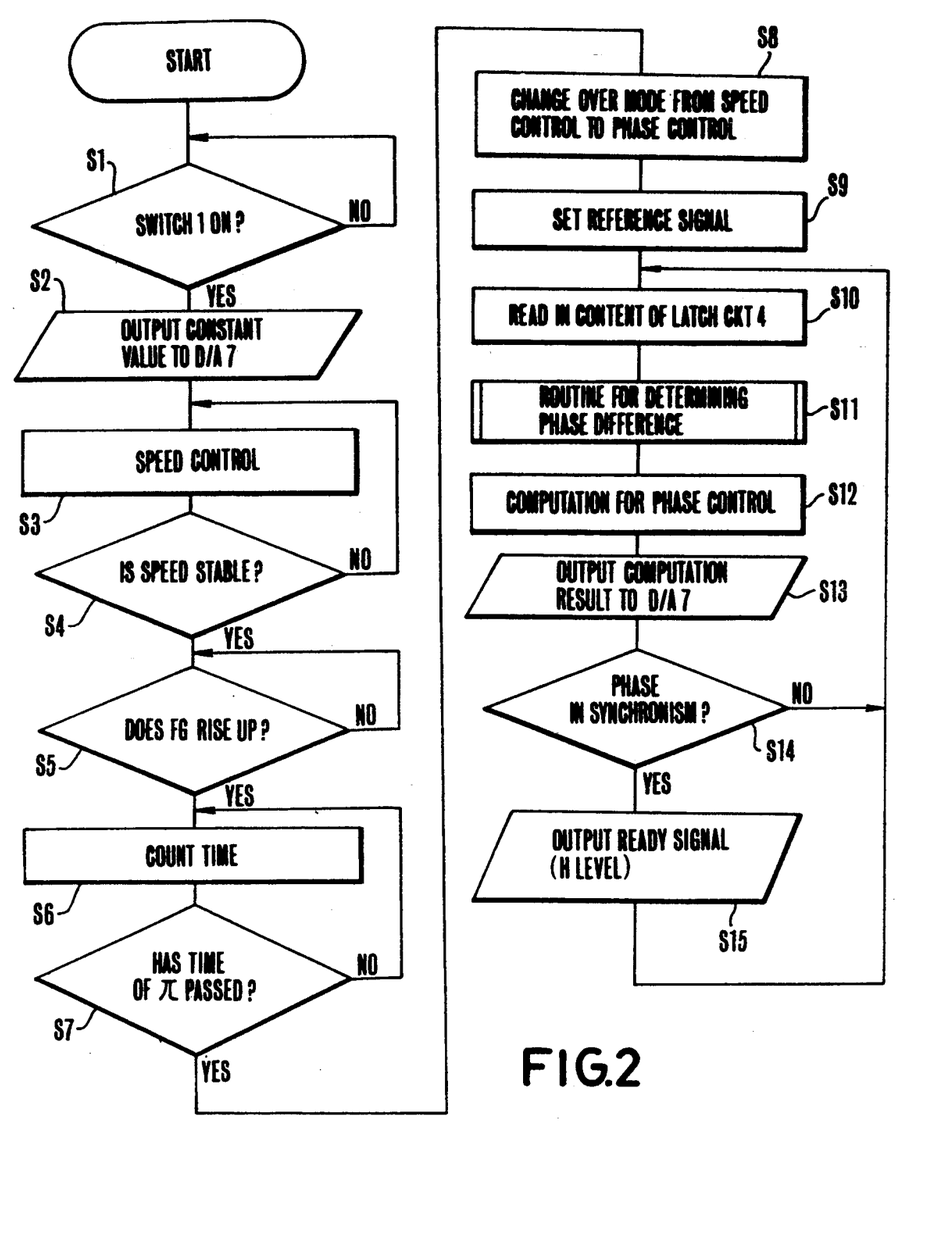
FIG. 2 is a flowchart illustrating an example of a manner in which the device of FIG. 1 operates.

In FIG. 1 there is shown an electronic still camera employing a disk drive device as one embodiment of a rotator drive device. The device includes a motor start switch 1, a system control computer unit 2 for controlling a device whole and performing various computations, the computer unit 2 having a CPU in the form of a microcomputer, a RAM with work areas, a ROM in which a program shown in FIG. 2 is stored, a counter and other components (not shown). The device further includes a timer-counter circuit 3 which is preset at the rising edge of an input (PRESET) signal 13 and counts time from an initial value as a clock signal is produced from a clock oscillator (not shown), a latch circuit 4 for holding the content of the timer-counter circuit 3 at each rising edge of an input signal, the parts 2, 3 and 4 constituting a phase control means, a system reference signal generating circuit 5 as a synchronizing signal source for producing a timing signal (synchronizing signal) for the entirety of the electronic still camera having an electric motor incorporated therein, a motor control reference signal generating circuit 6 as a reference signal source for producing a signal to which the phase control of the motor is referred, a D/A converter 7, a motor drive circuit 8 for amplifying a motor control signal of D/A converted form, and an electric motor 9 as the rotation drive means.

An FG (Frequency Generator) circuit 10 as the detecting means produces an FG signal corresponding to the speed of rotation of the motor 9, that is, for example, 16 pulses for every one revolution of the motor 9. A mode selector switch 11 responsive to a mode selection signal 14 moves between its "a" position where the speed is controlled by using the speed deviation, or the speed control mode is set, and its "b" position where the speed is controlled by phase synchronization or the phase control mode is set. A phase signal generator (PG) produces a pulse of H level for one revolution of the motor in synchronism with the phase of the motor. 21 is an AND gate; 12 is the output signal of the FG circuit 10; 13 is the PRESET signal inputted to the "preset" input terminal of the counter circuit 3; 15 is the READY signal produced from the computer unit 2 and having H level when in phase synchronism or L level when out of synchronism; 16 is the reference signal generation timing signal produced from the computer unit 2; 17 is the reference signal produced from the control reference signal generating circuit 6; 18 is the output signal from the PG 19. A one-shot circuit 20 produces one pulse of H level whose width is almost equal to the period of the output signal of the PG when the READY signal 15 changes from L level to H level. 22 is an image pickup device; 23 is a signal processing circuit; 24 is a head; 25 is a recording medium as the rotator whose rotation is to be controlled.

Next, the operation of the device of FIG. 1 is described.

FIG. 2 illustrates a process for controlling the driving of the rotator according to the embodiment of the invention. In this embodiment, the motor 9 is synchronized with the vertical synchronizing signal of the video signal, and when their phases are in synchronism, the period of the FG signal 12 of the motor 9 is made equal to the period of the reference signal 17 from the control reference signal generating circuit 6, and the phase difference between the rising pulse edge of the FG signal and the rising edge of the reference signal 17 is made equal to $\pi$. Here, the reason why the phase difference is taken at $\pi$ is that the phase difference to be detected is allowed to vary over a widest possible range, when it is taken at $\frac{1}{2}$ of one revolution or $2\pi$.

At a time when the start begins, the motor 9 is assumed to be stopping from rotation. At this initial time, the switch 11 is in its "a" position, that is, the speed control mode is set. Now, a step S1 is executed. If the motor start switch 1 is closed, then the operation advances to a step S2 so that the system control computer unit 2 gives the D/A converter 7 an output of a constant value large enough to drive the motor 9.

Then the operation advances to a step S3. After the speed of the motor 9 has been controlled in the following manner in the step S3, a step S4 follows in the computer unit 2 to examine whether or not its speed is stable. That is, at first, in the step S3, the signal from the D/A converter 7 is inputted to the drive circuit 8, and the signal based on this from the drive circuit 8 is supplied to the motor 9. The motor 9 then starts to rotate. The FG circuit 10 produces an FG pulse signal 12 proportional to the period of rotation of the motor 9. Here, since the switch 11 is in the "a" position, the content of the timer-counter circuit 3 is sampled and held in the latch circuit 4 in synchronism with the rising edge of the FG pulse signal 12. At the same time, the timer-counter circuit 3 is preset and starts to count time from the initial value again. That is, the latch circuit 4 holds the period of the FG pulse in every one rising edge of the FG pulse signal. The computer unit 2 computes the difference between the held period of the FG pulse and the control target period (or, in the case of, for example, NTSC system, the period of the vertical synchronizing signal (1/60)sec./the number of FG pulses in one revolution (16)) as the amount of deviation, and produces an output representing the amount of adjustment of the speed which is then applied to the D/A converter 7. In such a manner, the speed of the motor 9 is controlled.

Then the operation advances to a step S4 in which whether or not the speed of the motor 9 is sufficiently stable in the neighborhood of the target speed is tested in the computer unit 2 based on the aforesaid amount of deviation. If the amount of deviation is larger than a prescribed value, indicating that the speed is unstable, then the operation returns to the step S3. If within the prescribed value, as the speed is stable, then advance to a step S5.

In the step S5, whether or not the FG pulse is at the rising edge is tested in the computer unit 2. If it is determined "yes", then the operation advances to a step S6 in which the computer unit 2 performs timing counting from the point in time of the rising edge of the FG pulse by a counter incorporated therein. Then the operation advances to a step S7 in which whether or not a time equal to ½ of the period of the FG pulse when in synchronism, namely, $\pi$ from the start of the counting has passed is determined in the computer unit 2. If "yes", then the operation advances to a step S8.

In the step S8, the computer unit 2 moves the switch 11 to the phase control mode position or "b" position. In the next step S9, the reference signal generation timing signal 16 from the computer unit 2 is applied to the control reference signal generating circuit 6. At a point in time when the time of $\pi$ from the rise of the FG pulse has passed in the computer unit 2, the generating circuit 6 starts to produce the reference signal 17.

Figure 4:
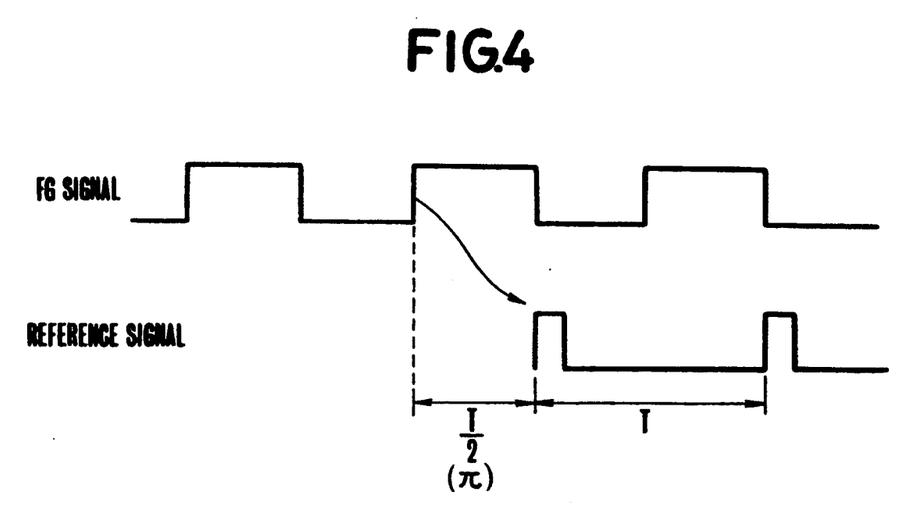
FIGS. 4 and 5 are timing charts illustrating two examples of the timing of the FG pulse signal with a clock signal.

FIG. 4 illustrates the timing of the FG signal and the reference signal at this time. Thereby, the counter circuit 3 when in the phase control mode is reset each time the output signal of the control reference signal generating circuit 6 rises up.

In a step S10, the computer unit 2 reads in the content of the latch circuit 4. The content of the latch circuit 4 is the counted value of the time from the rising edge of the reference signal 17 to the rising edge of the FG pulse. This represents the phase difference between the reference signal and the FG pulse signal.

In the next step S11, a routine for determining the phase difference is executed. By this routine, the deviation of the phase difference between the reference signal and the FG pulse from the target phase difference is corrected.

In the next step S12, based on this corrected deviation, the computer unit 2 computes the amount of adjustment. Then the operation advances to a step S13 in which the computation result from the computer unit 2, that is, the amount of adjustment is outputted to the D/A converter 7. Thereby, the phase of rotation of the motor 9 is controlled on the basis of the amount of adjustment. Then the operation advances to a step S14 in which on the basis of the content of the latch circuit 4 read by the computer unit 2, whether or not the actual phase difference between the reference signal and the FG pulse has reached the target or ideal phase difference, that is, whether their phases are in synchronism, is tested. If out of synchronism, then the operation returns to the step S10 to repeat the procedure. If their phases are determined to be in synchronism, then the operation returns to a step S15 in which the computer unit 2 produces the READY signal 15 of H level. Then the operation returns to the step S10.

The essential part of the embodiment of the invention, or the rotator drive control circuit next is described in detail.

Figures 3, 3A:
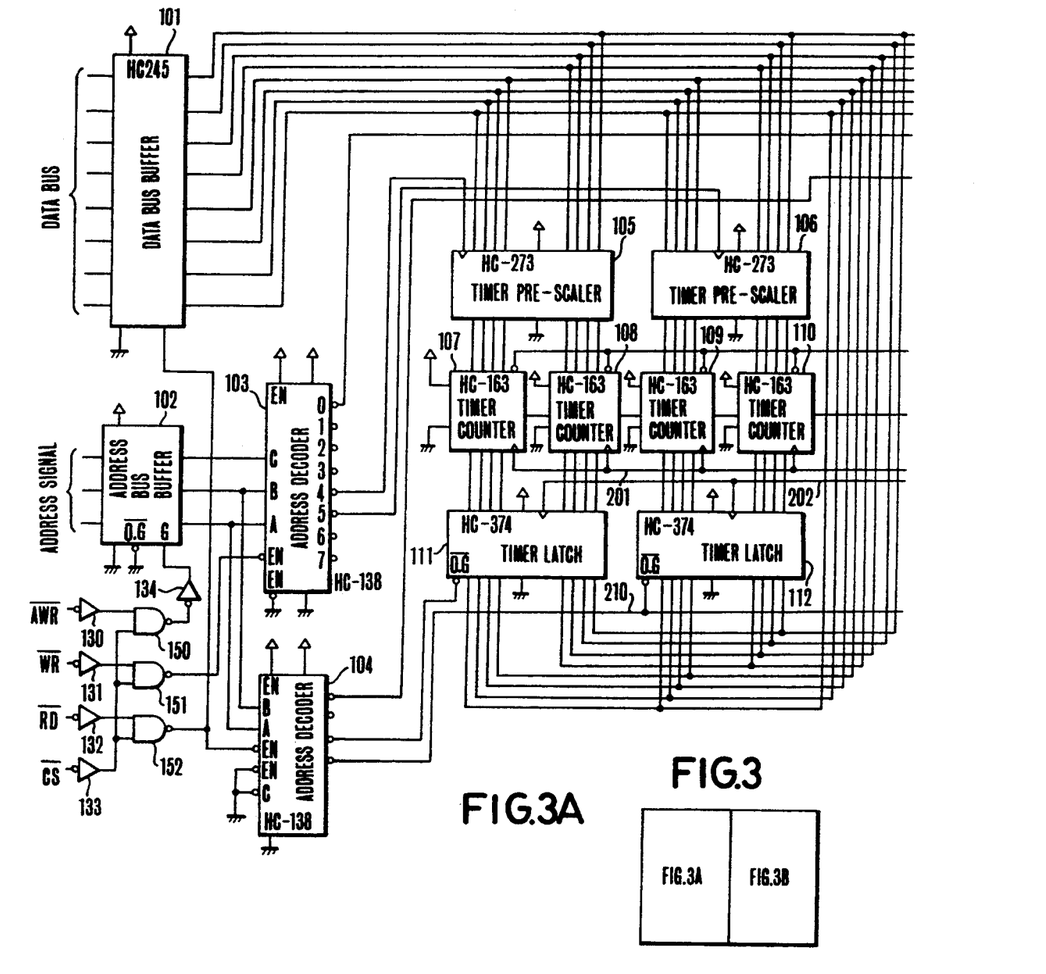
FIGS. 3, 3A and 3B show an electrical circuit diagram illustrating in detail an example of the construction of the main parts of the device of the invention.
Figure 3B:
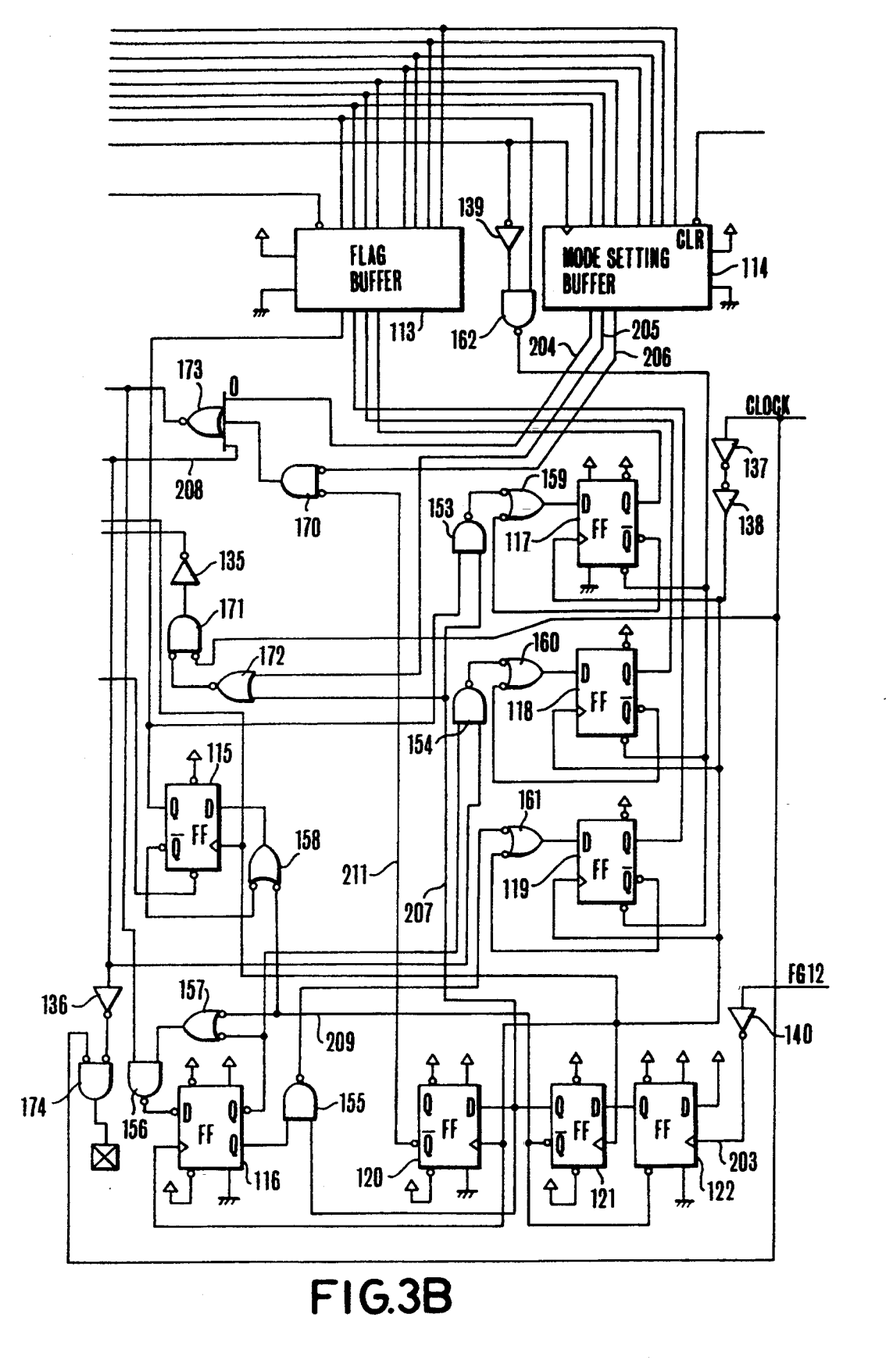

FIGS. 3, 3A and 3B illustrate the details of the construction and arrangement of the elements of the circuits 3, 4 and 6 and the switch 11 constituting the rotator drive circuit enclosed within a dot-and-dash line block in FIG. 1. Timer counters 107–110 perform counting of a clock signal 201 from initial values set by timer pre-scalers 105 and 106, constituting the counter circuit 3 of FIG. 1. Timer latches 111 and 112 responsive to a strobe signal 202 for holding the values of the timer counters 107–110, constitute the latch circuit 4 of FIG. 1. A flag buffer 113 latches the output of flip-flops (hereinafter abbreviated to FF) 117, 118, 119 and 115. A buffer 114 for setting modes controls the operation of the mode selection switch 11. An FF 112 operates with timing of a signal 203 obtained by inverting the FG signal 12. Another FF 121 latches the Q output of the FF 122 in the timing of the clock signal 201. Another FF 120 latches the Q output of the FF 121 in the timing of the clock signal 201. Another FF 116 latches the output of a NAND gate 156 in the timing of the clock signal 201. 130–140 are inverter gates; 150–162 are NAND gates; 170–174 are NOR gates. For note, the reference signal generating circuit 6 in this embodiment has the timer counters 107–110 in common.

A data bus buffer 101 and an address bus buffer 102 are connected to the CPU of the system control computer unit 2 through data buses and address buses respectively. Address decoders 103 and 104 are connected to the address buffer 102. The CPU supplies a chip select signal $\overline{CS}$, a read signal $\overline{RD}$, a write signal $\overline{WR}$ and an address line signal $\overline{AWR}$ for activating the address bus buffer 102.

The operation of the circuit of FIGS. 3, 3A and 3B is described below.

At first, the device is assumed to be set in the phase control mode by mode select signals 204, 205 and 206 of which the first two have L level and the last has H level. At this time, the target period of the FG is set in the pre-scalers 105 and 106 by the complement-of-2 representation of the multiplied period of the clock signal 201 by an integer. Then, after the FG signal 203 has risen, when the signal 207 which is synchronized with the clock signal 201 through the flip-flops 121 and 122 rises up, the signal 202 becomes L level, causing the the values of the timer counters 107–110 to be latched in the timer latches 111 and 112. At the same time, by the signal 209 which is the inversion of the signal 207, the output of FF 115 is changed to H level. Also, by the overflow signal of the timer counter 107–110, the output of the gate 173 is changed to L level at which the counter 107–110 start to count again from the values set in the pre-scalers 105 and 106. That is, the measured value of time from the start of the re-counting of the timer counters 107–110 to the moment at which the FG signal 203 rises up is stored in the timer latches 111 and 112. That is, the phase control is carried out by controlling the phase of rotation of the motor 9 so as to bring this value to constant.

By the way, the fact that the data have been latched in the timer latches 111 and 112 can be sensed in the form of a change of the Q output of the FF 115 to H level as has been described above. But, at this time, it is considered that before the contents of the latches 111 and 112 are read out, the next FG signal 203 rises up. The FF 115 is cleared by the READ strobe signal 210 of the timer latch 112. But, if the FG signal 203 rises up before the READ strobe signal 210 becomes L level, the output of the NAND gate 153 becomes L level and the Q output of the FF 117 becomes H level. That is, referring to the content of the flag buffer 113 corresponding to this signal when, for example, in the steps S10–S15 of the phase control process, the CPU of the computer unit 2 can detect the fact that the FG signal 203 has risen up twice or more during the time until the contents of the timer latches 111 and 112 are read in.

In general, when the microcomputer or the like is applied to the computation for the phase control, an event sometimes occurs that the computation occurs too late. For this case, the normal procedure of computing operations may partly be skipped with the essential operations being retained, so that the computing is not too late for the timing with the next FG pulse. Even if the computing for the phase control is skipped, for example, one out of several times, the phase of the motor 9 is not largely disturbed. So, in such a case, the only treatment may be limited to the resetting of the FF 117, that is, the changing of the input of the gate 139 to L level, which is followed by waiting for latching of the next data.

Next, an alternative case is considered in which the FG signal 203 has not even once risen up in the time interval from the moment at which, as the timer counters 107–110 overflowed, the re-counting was started to the moment at which they have overflowed for the next time.

At first, when the timer counters 107–110 overflow, the output of the NAND gate 156 becomes H level. Therefore, the Q output of FF 116 has H level. In this state, when the FG signal 203 rises up to change the signal 209 to L level, if the timer counters 107–110 do not overflow yet, the output of the NAND gate 156 becomes L level, and the output Q of the FF 116 becomes L level. But, if the overflow signal 208 of the timer counters 107–110 becomes H level again before the FG signal 203 rises up, because both inputs of the NAND gate 154 become H level, the Q output of FF 118 is set to H level.

This allows for the CPU of the computer unit 2 to be able, upon reference to the content of the flag buffer 113 corresponding to this signal when, for example, in the phase control process, to detect the fact that no rising up of the FG signal occurs during the time between after the timer counter 107–110 overflowed and before they have overflowed for the next time.

Though such a situation may be taken as an abnormal operation to stop the motor, it is fairly considered that the subsequent phase control is necessary. For this case, the input of the gate 139 is first changed to L level to reset the FF 118. Then, based on the reference to the state of the signal of the flag buffer 113 as has been described above, or using this as an interrupt signal, transition to the speed control mode is made. At a time when the speed has become stable, transition to the phase control mode again is then made.

For the speed control mode, the mode select signals 204–206 are all set to L level, and zero is set in the pre-scaler. Then, in a slight delay from the rising up of the FG signal 203, the signal 207 rises up, causing change of the signal 202 to L level at which time the values of the timer counters 107–110 are stored in the timer latches 111 and 112, and also causing change of the signal 211 to L level and change of the output of the gate 173 to L level, at which time the counters 107–110 load the values of the pre-scalers, that is, are reset to zero and start to count again. Since the concurrent values of the timer latches 111 and 112 represent the period of the FG signal, the speed may be controlled in accordance with this value.

Next, an alternative case is considered in which the FG signal 203 has twice or more risen up during the time between after, as the timer counters 107–110 overflowed, the re-counting was started and before the next overflowing has occurred.

At first, when the timer counters 107–110 overflow, the output of the NAND gate 156 becomes H level. Therefore, the Q output of the FF 116 becomes H level, and its $\overline{Q}$ output becomes L level. In this state, when the FG signal 203 rises up to change the signal 209 to L level, because, at this time, the timer counters 107–110 do not overflow yet, the output of the NAND gate 156 becomes L level, the Q output of the FF 116 becomes L level, and its $\overline{Q}$ output becomes H level. If, here, the counters 107–110 overflow, the outputs of the NAND gate 156 becomes H level, the Q output of the FF 116 becomes H level, and its $\overline{Q}$ output becomes L level. But, if the FG signal 203 once more rises up before the overflowing occurs, the output of the NAND gate 155 becomes L level, and the Q output of the FF 119 becomes H level.

This allows for the CPU of the computer unit 2 to be able, upon reference to the corresponding content of the flag buffer 113 through the data buses when, for example, in the course of controlling the phase, to detect the fact that the FG signal 203 has twice or more risen up between the successive two occurrences of the overflowing of the the timer counters 107–110.

Even in this case, similarly to the foregoing case, the motor 9 may be stopped. But, when the subsequent phase control is necessary, the FF 119 is first reset by changing the input of the gate 139 to L level. Then, as has been described above, based on the reference to the signal state of the flag buffer 113, or by using this as the interrupt signal, the operation is routed to the speed control mode. After a good stability of the speed is attained, the device is switched again to the phase control mode.

Figure 5:
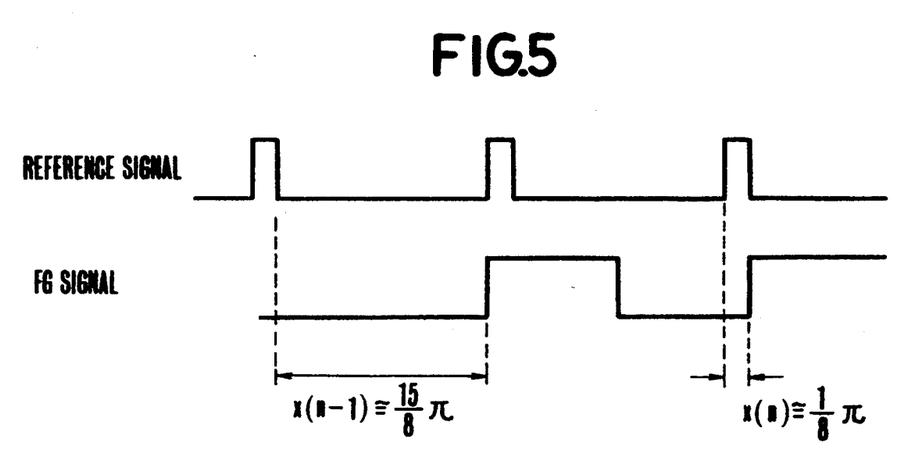

In such a manner, even when the FG pulse has deviated from the reference signal by more than $2\pi$, that is, such a situation as shown in FIG. 5 is encountered, without making an erroneous control, the phase difference between them can be made to quickly, reliably and stably fall within the range of 0 to $2\pi$.

For note, in the embodiment of the invention, since the phase control is carried out by using the FG pulses (for example, 16 pulses per one revolution of the motor), as compared with the PG pulse (one pulse per one revolution of the motor), a more accurate phase synchronization is possible. After the phase synchronization, by the step S15 the READY signal 15 of H level is produced. Responsive to this, the one-shot circuit 20 produces a pulse which is longer than the period of the reference signal 17 but shorter than 2 times the period. And, since, as the motor is rotating, the PG 19 produces the signal 18 of H level once for each revolution at a particular phase, when the output of the one-shot circuit 20 has become H level, or the READY signal 15 has changed to H level representing that the phases have been synchronized with each other and the output signal 18 of the PG 19 changes to H level, the output of the AND gate 21 becomes H level to set the system reference signal generating circuit 5.

Therefore, the timing of the video signal processing system including the image pickup system of the electronic still camera can be quickly obtained by this system reference signal generating circuit 5. Moreover, at this time, the recording medium 25 and the reference signal generating circuit 5 are in perfect synchronism.

In such a manner, according to the embodiment of the invention, at the start of energization of the motor, the phase control based on the synchronizing signal is not carried out but only the speed control is carried out, thereby the influence of the phase error signal is not received. Therefore, the time until the speed is stabilized is short. Also, according to this embodiment, after the speed of the motor has become stable, the motor control is changed over from the speed control to the phase control. Moreover, the phase of the reference signal for this phase control is at first brought into coincidence with the phase of the motor, thereby it being made possible to minimize the variation of the phase of the motor at the time of changing over to the phase control mode so that the synchronization of their phases is established in a reduced time. Moreover, a synchronization of the thus-phase synchronized motor with the video signal can also be obtained quickly.

For note, though the embodiment of the invention has been described in connection with the use of the FG pulse in the control on assumption that the FG pulse is capable of deviating $2\pi$ or more to the reference signal, that is, as shown in FIG. 5, the present invention is applicable to the system using PG pulses in the control even on the same assumption, provided the value of the pre-scaler is altered to suit it.

Also, though the embodiment of the invention has been described as applied to the electronic still camera, it is of course possible to apply the invention to other various instruments having the drive mechanism for the rotator with great advantages and very easily.

What is claimed is:

1. A recording apparatus, comprising:
   (A) a motor for driving a disc-shaped recording medium;
   (B) a pulse generating circuit for generating a plurality of pulse signals corresponding to the revolutional speed of said disc-shaped recording medium;
   (C) a reference signal generating circuit for generating a reference signal pulse having a predetermined frequency;
   (D) speed control means for measuring an interval between said pulse signals output from said pulse generating circuit to detect the revolutional speed of said medium and for controlling said speed to a constant speed;
   (E) detecting means for detecting the speed of said medium to cause said speed to become a predetermined value under the operation of said speed control means;
   F) phase control means for controlling said motor so that a phase difference between said reference signal and said pulse signals becomes a predetermined value according to said detecting means; and
   G) recording means for enabling recording on said medium when the phase difference between said pulse signals and said reference signal becomes the predetermined value under the action of said phase control means.

2. An image recording apparatus according to claim 1, wherein said phase control means is arranged to effect an arithmetic operation of a phase-controlling amount in response to an amount of said phase difference, thereby correcting a phase of revolution of said motor.

3. An image recording apparatus according to claim 2, wherein said phase control means is arranged to stop the phase control when said phase difference exceeds a predetermined value and to operate the speed control means.

4. An image recording apparatus according to claim 1, wherein said speed control means includes a counter for measuring intervals of said pulse signals and said phase control means includes a counter for measuring said phase difference.

5. An image recording apparatus according to claim 1, wherein said speed control means and said phase control means are contained in a common microcomputer, respectively.

6. An image recording apparatus according to claim 5, wherein said recording medium is a magnetic disc, and said recording means records an image signal on said magnetic disc.

7. An image recording apparatus, comprising:
   (A) a motor for driving a disc-shaped recording medium;
   (B) a pulse generating circuit for generating a plurality of pulse signals corresponding to the revolutional speed of said disc-shaped recording medium;
   (C) a reference signal generator circuit for generating a reference signal pulse having a predetermined frequency;
   (D) detecting means for detecting an interval of said pulse signals and for detecting when said interval corresponds to a predetermined period;
   (E) phase control means, responsive to said detection means detecting that said interval of said pulse signals corresponds to said predetermined period, for phase-controlling said motor so that a phase difference between said pulse signals and said reference signal becomes $\frac{1}{2}$ of a phase of said reference signal; and
   (F) image recording means for enabling recording of an image signal on said medium after the phase difference between said pulse signals and said reference signal has been controlled to $\frac{1}{2}$ of said phase of said reference signal under the action of said phase control means.

8. An image recording apparatus according to claim 7, wherein said phase control means is arranged to effect arithmetic operation of a phase controlling amount in response to an amount of said phase difference, thereby correcting a phase of revolution of said motor.

9. An image recording apparatus according to claim 8, wherein said phase control mean is arranged to stop the phase control when said phase difference exceeds a predetermined value and to operate said speed control means.

10. An image recording apparatus according to claim 7, wherein said speed control means includes a counter for measuring intervals of said pulse signals, and said phase control means includes a counter for measuring said phase difference.

11. An image recording apparatus according to claim 7, wherein said recording means records said image signal.

12. A video camera, comprising:
(A) driving means for driving a recording medium;
(B) first pulse generating means for generating a plurality of pulses, for every revolution of said driving means:
(C) second pulse generating means for generating pulses indicating a phase of revolution of said driving means, for every revolution of said driving means;
(D) first output means arranged to measure the pulse intervals of said plurality of pulses output from said first pulse generating means to detect a speed of revolution of said driving means and to output a predetermined signal when said speed of revolution has reached a predetermined speed;
(E) reference signal generating means for generating a reference signal in response to said predetermined signal output from said outputting means;
(F) second output means arranged to measure a phase difference between said reference signal and said first pulse signal to detect a phase of revolution of said driving means and to output a ready signal indicating a state where recording is possible, when said phase difference becomes ½ of the signal interval of said reference signal; and
(G) information recording means operable in response to said ready signal to record an information on said recording medium in synchronism with the pulses output from said second pulse generating means.

13. A video camera according to claim 12, wherein said first and second output means comprise microcomputers.

14. A video camera according to claim 12, wherein said first output means includes speed control means; said second output means includes phase control means; said speed control means is arranged to effect an arithmetic operation for speed control for every one of a plurality of pulses generated by said first pulse generating means; and said phase control means is arranged, when its arithmetic operation for phase control has not completed within a period of said pulse, to pause the arithmetic operation until the succeeding phase control operation.

15. A video camera according to claim 12, wherein when the pulse output from said first pulse generating means is not detected beyond a predetermined period said phase control is paused and the speed control is effected.

* * * * *

UNITED STATES PATENT AND TRADEMARK OFFICE
CERTIFICATE OF CORRECTION

PATENT NO. : 5,345,532
DATED : September 6, 1994
INVENTOR(S) : Nobuo Fukushima

It is certified that error appears in the above-identified patent and that said Letters Patent is hereby corrected as shown below:

Col 1, line 21.  Change "that the" to -- to control --.

Col. 1, line 41.  After "If" insert -- , --.

Col. 1, line 42.  Delete "as".

Col. 2, line 13.  Delete "cap".

Col. 2, line 63.  Change "furthermore" to -- further --.

Col. 3, line 48.  After "switch 1," insert -- and --.

Col. 6, line 5.  Change "returns" to -- advances --.

Col. 6, line 61.  Change "counter" to -- counters --.

Col. 7, line 12.  After "referring," insert -- through the data bus --.

Col. 7, line 56.  Delete "for".

Col. 7, line 66.  Change "again is then made" to -- is then made again --.

Col. 9, lines 63-64.  Delete "under the operation of said speed control means --.

Col. 9, line 65.  After "means" insert -- responsive to said detecting means causing said speed to become said determined value, --.

UNITED STATES PATENT AND TRADEMARK OFFICE
CERTIFICATE OF CORRECTION

PATENT NO. : 5,345,532

DATED : September 6, 1994

INVENTOR(S) : Nobuo Fukushima

It is certified that error appears in the above-identified patent and that said Letters Patent is hereby corrected as shown below:

Col. 9, line 68, before "value" insert —phase—.

Signed and Sealed this

Twenty-seventh Day of June, 1995

Attest:

BRUCE LEHMAN

*Attesting Officer*   Commissioner of Patents and Trademarks